United States Patent [19]
Morton et al.

[11] Patent Number: 4,897,726
[45] Date of Patent: * Jan. 30, 1990

[54] METHOD AND APPARATUS FOR INTERACTING WITH TELEVISION IMAGES

[76] Inventors: Richard G. Morton, 17786 Aguamiel Rd., San Diego, Calif. 92127; Kenneth Avicola, 5303 Sandy Grove, Kingwood, Tex. 77339

[*] Notice: The portion of the term of this patent subsequent to Apr. 19, 2005 has been disclaimed.

[21] Appl. No.: 167,541

[22] Filed: Mar. 14, 1988

Related U.S. Application Data

[62] Division of Ser. No. 850,834, Apr. 11, 1986, Pat. No. 4,739,406.

[51] Int. Cl.⁴ .......................................... H04N 5/272
[52] U.S. Cl. ...................................... 358/183; 358/22; 358/93
[58] Field of Search ................... 358/183, 188, 22, 93, 358/903; 273/1 E, 316

[56] References Cited
U.S. PATENT DOCUMENTS 3,921,161 11/1975 Baer ....................................... 358/93
4,145,043  3/1979 Olliges ................................... 358/93
4,579,338  4/1986 Heffron ................................ 358/903
4,616,261 10/1986 Crawford ............................ 358/183
4,739,406  4/1988 Morton ................................ 358/183

OTHER PUBLICATIONS

Rabbit Double Play, Citicorp-Dinners Club "Living in Style" Catalog, Received Sept. 21, 1987.
Intellivision Cartridge Instructions, Space Battle, Mattel, Inc. 1980.

Primary Examiner—Tommy P. Chin
Attorney, Agent, or Firm—Baker, Maxham, Jester & Meador

[57] ABSTRACT

Apparatus for use with a standard television (TV) receiver for superimposing information or images over portions of the broadcast scene. Synchronization signals are generated by locking onto the horizontal sweep electromagnetic interference (EMI) generated by all television receivers. A wideband noise (RF) burst is generated and coupled to the antenna input leads of the television receiver. The picture content of the TV scene at the time of the noise burst is disrupted and various effects are created by controlling the level of the noise bursts. By controlling the position of the RF noise, an image may be created and superimposed over any part(s) of the scene. The scene may be derived from any source, such as standard television broadcast, a video cassette recorder (VCR), electronic game or computer monitor. No modification of the television receiver is required, and no change to the apparatus is needed when the TV is tuned from one broadcast channel to another.

5 Claims, 3 Drawing Sheets

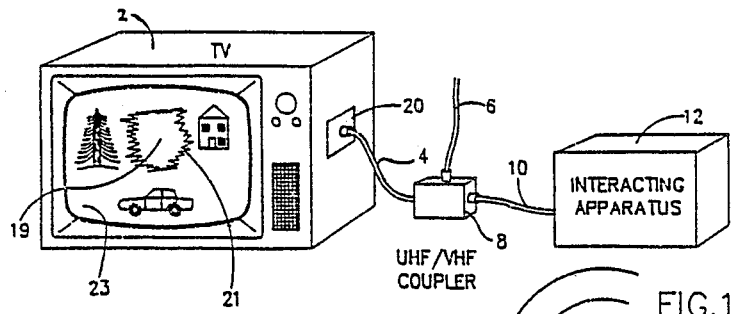
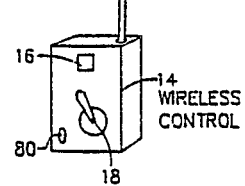
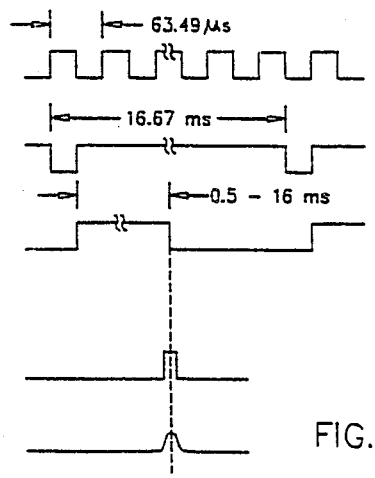
FIG. 3
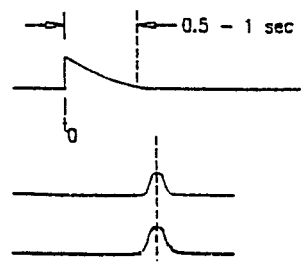

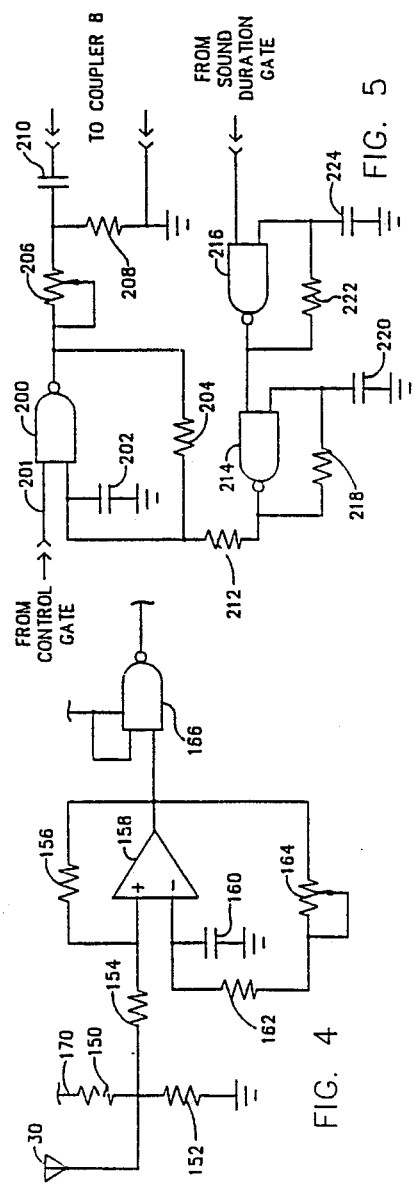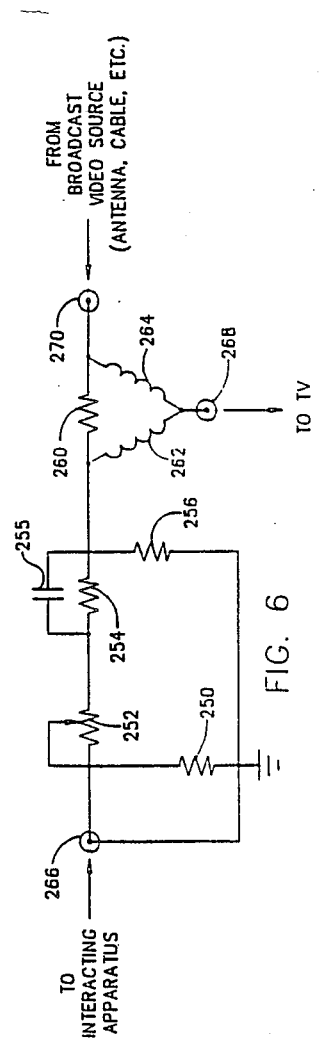

METHOD AND APPARATUS FOR INTERACTING WITH TELEVISION IMAGES

This is a division of application Ser. No. 850,834 filed Apr. 11, 1986 now U.S. Pat. No. 4,739,406.

TECHNICAL FIELD

This invention relates to the apparatus and methods for superimposing images over standard television broadcast scenes. It also relates to video systems, remote control, external TV synchronization, and TV games.

BACKGROUND OF THE INVENTION

At present there is a growing discontent with television programming and also annoyance with commercials. Many feel that the only recourse is writing letters to the networks or tuning the set off. Neither of these is very (or immediately) satisfying. It would be desirable to provide a method and apparatus that would permit a viewer to immediately vent his or her frustration or dislike with regard to a particular TV program segment. Such a method and apparatus should not permanently interfere with normal functioning of the TV.

SUMMARY OF THE INVENTION

According to the present invention, an amusement device is used to extract some pleasure from these formerly frustrating TV offerings. With this device a button is pressed and explosion-like effect (video) with accompanying sound occurs. This is accomplished with a small remote control unit.

There are many potential applications of this invention. For example, alpha-numeric characters may be placed on the screen to be recorded along with the TV images for VCR recording. Special effects equipment now available to perform such functions are relatively expensive. Two unique methods employed in this invention are: (1) obtaining synchronization information for placement of the added video by means of EMI emitted from the TV receiver and (2) generation of the desired additional image by means of wideband RF noise which makes operation channel independent. It is these methods which make the apparatus inexpensive compared to alternate means.

Another application of this invention is as a toy intended for pseudo-interaction by children with cartoons developed for this purpose. The image and sound effects could be modified to eliminate violent connotation if desired. For example, a cartoon character who always overcomes evil would be aided by the child "zapping" the evil character with a symbol representing the hero character.

The present invention provides apparatus which can easily be attached to a television receiver for adding video information to the broadcast video, with no modification to the receiver itself. The apparatus is simple to use and inexpensive to construct.

According to the present invention, circuitry is provided to lock an internal oscillator to the horizontal sweep of the receiver, which provides synchronization information. This is accomplished by injection locking the oscillator by means of the receiver horizontal sweep EMI generated during the portions of the raster scan known as "flyback". Circuitry is also provided to generate wideband RF noise. An infinitely narrow voltage spike has frequency components spanning the entire electromagnetic spectrum, including the carrier frequencies used to broadcast television programs. If such a spike, or facsimile thereof, is applied to the receiver antenna, it will cause a momentary disturbance on the video at that instant. Thus, a dot will appear at the point of the screen which is being scanned by the cathode ray tube electron beam at that moment. By applying the RF noise at appropriate times, an image can be generated and superimposed over the broadcast video.

In the present invention an RF oscillator operating at approximately 15 MHz and with very sharp rise and fall times is used as the wideband noise source. The oscillator is gated on an off as necessary to create the desired image. the sharp rise and fall times, like a narrow spike, contain a broad radio frequency spectrum.

In the disclosed embodiment the apparatus is contained in two units. The main unit is located near the receiver and a short antenna in the unit detects the receiver EMI. The image forming and RF burst circuits are also contained in the main unit. A small, battery powered, second unit is the operator interface. The unit has a two-axis joy stick and "fire" button. The joystick is used to place a small unobtrusive cursor on the TV screen. When the "fire" button is pressed, a new image appears centered on the cursor position. In the example of the amusement device application, an explosion-like image appears. Additional circuitry in the main unit generates ah explosion sound at the same time. The second unit is a wireless control device.

A number of advantages are obtained by the present invention. Firstly, unlike other special effects generators, it is not necessary to generate a separate RF carrier frequency for each TV channel. Secondly, it is not necessary to generate any carrier at all, a normally complex procedure. The effect occurs on any channel to which the TV may be tuned. A further advantage is that images can be superimposed over the broadcast video rather than just supplanting a portion of the screen. By adjusting the strength of the RF noise signal, an image can either replace the broadcast video or be superimposed on it.

An additional advantage of this invention arises from the fact that the effects described are incorporated into a unit which simply attaches to any television receiver without having to modify the receiver or interfere with its normal operation.

Other features and advantages not found in the preexisting devices will become more readily understood from the following detailed description, taken in conjunction with the appended claims and attached drawings.

BRIEF DESCRIPTION OF THE DRAWINGS

FIG. 1 illustrates the manner in which the preferred embodiment is connected to a conventional television receiver.

FIG. 3 illustrates a series of waveforms forming a timing diagram which helps explain the operation of the circuitry of FIG. 2.

FIG. 4 is a schematic diagram of the locked oscillator.

FIG. 5 is a schematic diagram of the RF oscillator.

FIG. 6 is a schematic diagram of the coupler.

DESCRIPTION OF THE PREFERRED EMBODIMENT

Overview

Figure 2:
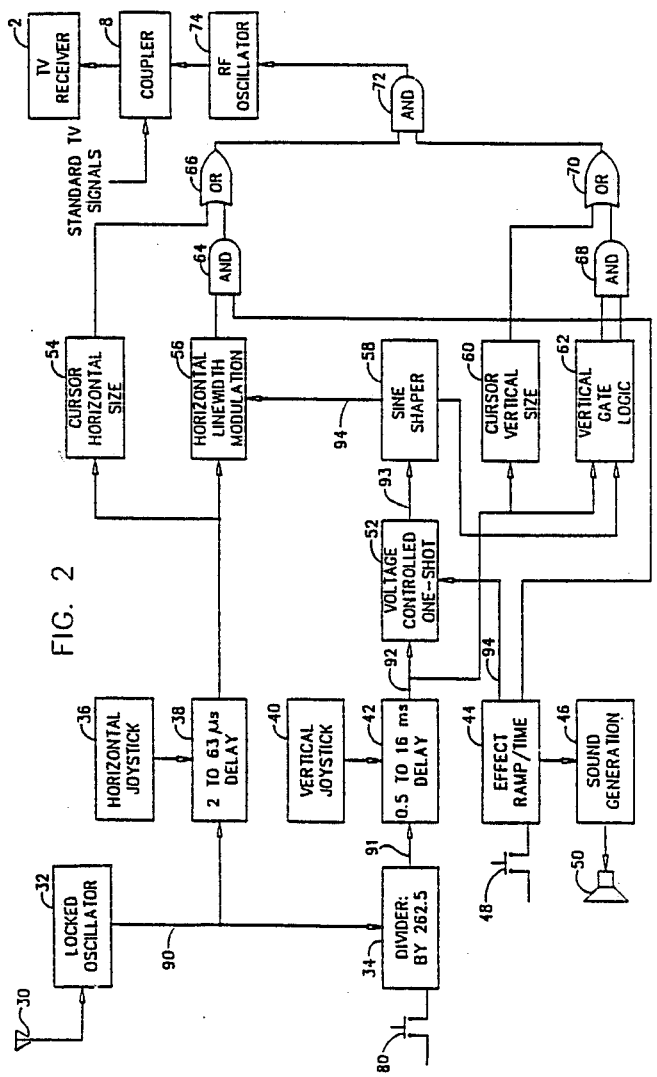
FIG. 2 is a block diagram of the electronic circuitry of the preferred embodiment.

Referring to FIG. 1, an antenna or cable TV input 6 is connected to the antenna terminals 20 of a conventional television receiver 2 by means of a UHF/VHF coupler/combiner 8 and cable 4. The interacting apparatus is connected to the coupler 8 by cable 10. Standard broadcast TV signals enter via cable 6, and the images to be superimposed appear on line 10. The interacting apparatus 12 is controlled by the remote image to be superimposed by means of the joystick 18 which locates a small cursor 19 on the TV screen. The joystick 18 is part of a wireless control 14. The fire button 16 is depressed when the superimposed image 21 is to appear over a select port of a scene 23 displayed on the TV. The roll button 80 provides initial placement of the cursor when the TV is first turned on. The coupler/combiner 8 may be selected from commercially available parts such as Archer #15-11418. The antenna 22 transmits the control signals to the interaction apparatus 12. As is well known in the art, wireless control signals may be transmitted either by radio waves or by an infrared link (not shown).

Generation of the required waveforms can be understood with reference to the block diagram of FIG. 2. The locked oscillator 32, later described in detail, oscillates at a frequency of 15,750 Hz. It is locked to the 15,750 frequency of the TV receiver horizontal sweep by means of the antenna 30 which detects the signal (EMI) emitted by the TV receiver horizontal sweep generator. All televisions based on a cathode ray tube (CRT) emit this signal because of the high voltages and fast rate of change of voltage required in scanning the screen. Each cycle of oscillator 32 corresponds to one horizontal line on the TV screen. The signal from oscillator 32 is fed to delay 38 and divider 34. Delay 38 is variable from about 2 to 63 microseconds, which is the time required to write one horizontal TV line. The amount of delay is set by the potentiometer of the horizontal joystick 36. The joysticks are shown connected directly to the delay electronics in this diagram as they would be in a wired remote control version. This is done for simplicity of illustration, but a wireless remote control, described later, is preferred.

Divider 34 divides the 15,750 Hz oscillator signal by a factor of 262.5, thus yielding a 60 Hz signal. The start of each cycle of this signal corresponds to the start of a new picture field. A complete picture frame consists of two interleaved fields for a total of 525 lines. This signal feeds delay 42 which is controlled by the potentiometer of joystick 40. The output of delay 38 is fed to the cursor horizontal size circuit 54 and the horizontal line width modulation circuit 56. The cursor horizontal size is set by the one-shot circuit 54. For example, a cursor size equal to 2% of the screen horizontal size would require that circuit 54 provide a 1.2 microsecond gate. Similarly, for a 2% cursor vertical size the one-shot of 64 must provide a gate 0.32 milliseconds long. The output of circuit 56 is a gate width which will define the portion of each horizontal TV line which will be "written over" to generate the new image information. Details of the required waveform to generate a particular image will be described more fully hereafter using the timing diagram of FIG. 3.

The output of delay 42 triggers voltage controlled one-shot 52, which is on a time varying, or chirped one-shot. The control signal to 52, which determines the width of the one-shot as a function of time, is derived from the effect generator 44. Push button 48 initiates the effect generator 44, which then triggers the sound generator 46. A variety of sound effects can easily be generated with a single integrated circuit (IC) such as SN 94281. The sound generator 46 drives a speaker 50. Delay 42 also triggers the cursor vertical size one-shot 60 and is an input to the vertical logic gate circuit 60. The voltage controlled one-shot 52 is converted by sine shaper 58 into a time varying half sine wave which is then the control signal to the horizontal linewidth modulator 56 and is also one input to the vertical gate logic circuit 62.

"And" gate 72 serves as an enable gate to RF oscillator 74. Whenever RF oscillator 74 is on, an image element is being superimposed over the TV video signal. A cursor will therefore always be present because "or" gates 66 and 70 permit the passage of the vertical and horizontal gates. The "explosion" or other image is only enabled when the "fire" button 48 is depressed and "And" gates 64 and 68 are enabled.

It should be appreciated that the locked oscillator 32 will initially lock at an arbitrary position with respect to the TV picture frame. The cursor will therefore appear at a random vertical position with respect to the screen. Pushbutton 80 provides a means of centering the cursor vertically. When pushbutton 80 is depressed, divider 34 is made to divide by a different factor, say 260.5, and the cursor will slowly roll in the vertical direction. With the vertical joystick in its center position, the roll button 80 is depressed until the cursor moves to screen center, and then released. The cursor is then centered in the joystick range.

Elements of the system can be more clearly understood with the aid of the timing diagram of FIG. 3. Waveforms of various points on the block diagram (FIG. 2) are shown. A square wave with a frequency of 15,750 Hz, locked to the TV receiver horizontal sweep, appears at 90. After division of 262.5 a 60 Hz signal appears at 91. A variable delay of from about 0.5 ms to about 16 milliseconds (ms) results in a transition somewhere in this range at position 92. A voltage controlled one-shot produces a pulse of from 2 to 4 ms, centered at the transition 92, as shown at 93. This pulse is shaped into an approximation of a half sine wave by a low pass filter in 58. The resulting waveform is shown as 94. When the fire button is initially depressed a waveform, shown as 95, is generated. This decaying voltage with an adjustable decay time sets the duration of the explosion effect. This control voltage causes the voltage controlled one-shot, 52, to initially have a narrow width, which then increases over a half to one second interval. The result, as shown at later times of one quarter second and one half second are shown in 94(b) and 94(c). To form an explosion like effect, a small circle is formed at the cursor position, and is made to grow rapidly in size. The half sine wave produces a circular image on the screen as follows. The amplitude of the half-sine controls the width of one image on each horizontal line by means of the control signal 94 and the horizontal linewidth modulator 56. Since the amplitude of a half-sine starts small, increases smoothly, then decreases smoothly, a circular image is formed if the width and amplitude of the half-sine are in the proper proportion. The width of the half-sine controls the vertical size of the image (or circle) and the amplitude controls the horizontal size. For example, if the final width of the half-sine is 4 ms, the image will fill about one quarter of the screen size, which is the equivalent of 16.67 ms.

Locked Oscillator

The locked oscillator 32 is illustrated in detail in FIG. 4. Operational amplifier 158, resistors 156, and 162, capacitor 160, and potentiometer 164 form an "astable" oscillator. The oscillating frequency is adjusted by means of potentiometer 164. Antenna 30 can simply be a few feet of wire coiled in the box containing the electronics or it may run along cable 10 (FIG. 1). Resistors 150, 152, and 154 serve to impedance match and bias the operational amplifier. The operational amplifier and wire 170 are connected to a power supply, now shown.

Potentiometer 164 is set so that with no signal at antenna 30, the oscillator will free run at a frequency just less than 15,570 Hz; approximately 15,500 Hz. When a rising voltage on the output of the operational amplifier causes capacitor 160 to charge to a voltage higher than that at the positive operational amplifier input, a transition on the output occurs. When the antenna is placed near an operating TV receiver noise spikes are picked up at each cycle of the horizontal sweep generator. This spike causes a premature transition in the otherwise free running oscillator. The oscillator thus becomes locked to the TV horizontal sweep. This lock is necessary in order to write information repeatedly and in a stable manner with respect to the TV broadcast scenes. "Nand" gate 166 serves to square up the output of the locked oscillator and provide isolation to the circuitry which follows the oscillator. Operational amplifier 158 may be any of the commercially available types such as LM-324.

RF Oscillator

The function of the RF oscillator 74 is to provide a reasonable approximation to wideband noise. If the frequency spectrum of this oscillator covers the frequencies represented by all of the VHF and UHF bands, then the video can be disrupted at appropriate times to form images independent of the channel to which the receiver is tuned. The oscillator described performs this function. It should be pointed out that with the ardent use of Video Cassette Recorders, the requirement for a uniform wideband source can be relaxed since a VCR or converter converts all VHF and UHF channels to a single tuner frequency (corresponding to channel 3 or 4).

Referring to FIG. 5, an astable RF oscillator is formed by NAND gate 200, feedback resistor 204, and charging capacitor 202. Capacitor 202 and resistor 204 are chosen to have values small enough for fast transition speed operation. Values of 22 pF and 1 kohm are typical. NAND gate 200 can be chosen among many commercially available fast bipolar gates, such as 74LS132. When it is desired to "write" information over the existing broadcast video, line 201 goes "high" and the oscillator is enabled. Potentiometer 206 and resistor 208 form a voltage divider. By adjusting potentiometer 206 the RF level going to the coupler 8 via coupling capacitor 210 may be adjusted.

Two additional astable oscillators are formed by NAND gate 214 with resistor 218 and capacitor 220, and by NAND gate 216 with resistor 222 and capacitor 224. These oscillators are gated "on" during the time the sound chip is activated. NAND oscillator 214 oscillates at about 50 kHz and NAND oscillator 216 at about 7 Hz. The fast oscillator is being gated on and off by the slow oscillator. The fast oscillator is coupled to the RF oscillator by the isolation resistor 212. The effect of these modulating signals is to induce rapid frequency shifts in the RF oscillator (chirping). The chirping of the RF oscillator induces interesting color changes in the explosion-like image on the screen.

Coupler

The output of the RF oscillator could be connected directly to the TV receiver input (through capacitor 210 of FIG. 5) and obtain reasonable results. However, the interacting apparatus can cause degradation of the broadcast picture quality if connected in this manner. The picture quality can be maintained without any visible degradation by using a coupler. Modification of a commercially available coupler (such as Archer #15-11418) can provide a means of adjusting, right at the coupler, the relative strengths of the broadcast signal and the interacting apparatus signal. FIG. 6 shows this coupler modification. Coils 262, and 264, resistor 260, and cable connectors 266, 268, and 270 are part of the standard device. Resistors 250, 254, capacitor 258, and potentiometer 252 form a voltage divider and impedance matching network.

Typical values are:
R250=51 ohms
R254=1 kohm
R252=100 kohm
R256=75 ohms

The coupler, as used in the system, is shown as item 8 in FIG. 1.

Remote Control

As shown in the block diagram of FIG. 2, two pushbuttons and a two-axis joystick with associated potentiometers are required to operate the interacting apparatus. These can be mounted in a small control box and wired to the interacting apparatus hardware box near the TV receiver. It is more convenient to have a wireless control as shown in FIG. 1, item 14.

It is well known in the art how to fabricate such a wireless remote control, and easily implemented by one skilled in the art. For example, National Semiconductor IC type LM1871 may be used as the Radio Control encoder/transmitter and the LM1872 as the Radio Control Receiver/Decoder. The specification sheets and application notes provided with these chips give detailed schematics and fabrication procedures for implementing such a system. Either RF or infrared links may be constructed.

Having described a preferred embodiment of the present invention, it will be clear to those skilled in the art that modifications and alternatives to the disclosed apparatus exist within the scope and spirit of the present invention. Accordingly, it is intended to limit the scope of the present invention only as indicated in the following claims.

What is claimed is:

1. An apparatus for interacting with a TV, comprising:
    means for generating a disruption signal representative of an image to be superimposed over a portion of a scene displayed on the TV, the scene being derived from a video signal received by an antenna input of the TV from a source, the disruption signal generating means including an RF oscillator having a bandwidth that covers substantially all of a VHF band and a UHF band;

means for coupling the disruption signal generating means to the antenna input of the TV;

means for synchronizing the disruption signal with the video signal to produce a synchronized disruption signal;

means for adjusting the amount of delay of the synchronized disruption signal to thereby determine a vertical position and a horizontal position on the scene where the image will be superimposed; and means for manually controlling the adjustable delay means for allowing a viewer to cause the superimposed image to appear over the selected portion of the scene at a selected time.

2. An apparatus according to claim 1 wherein the synchronizing means includes a locked oscillator.

3. An apparatus according to claim 1 and further comprising means for simultaneously generating a selected sound effect each time the viewer causes the superimposed image to appear over the selected portion of the scene.

4. An apparatus according to claim 1 wherein the superimposed image has the general appearance of an explosion.

5. An apparatus for interacting with a TV, comprising:

means for generating a disruption signal representative of an image to be superimposed over a portion of a scene displayed on the TV, the scene being derived from a video signal received by an antenna input of the TV from a source;

means for coupling the disruption signal generating means to the antenna input of the TV;

means for synchronizing the disruption signal with the video signal to produce a synchronized disruption signal, including an oscillator locked to a horizontal sweep EMI signal generating during a flyback portion of a raster scan of the TV;

means for adjusting the amount of delay of the synchronized disruption signal to thereby determine a vertical position and a horizontal position on the scene where the image will be superimposed; and means for manually controlling the adjustable delay means for allowing a viewer to cause a superimposed image to appear over the selected portion of the scene at a selected time.

* * * * *